Figure 1:
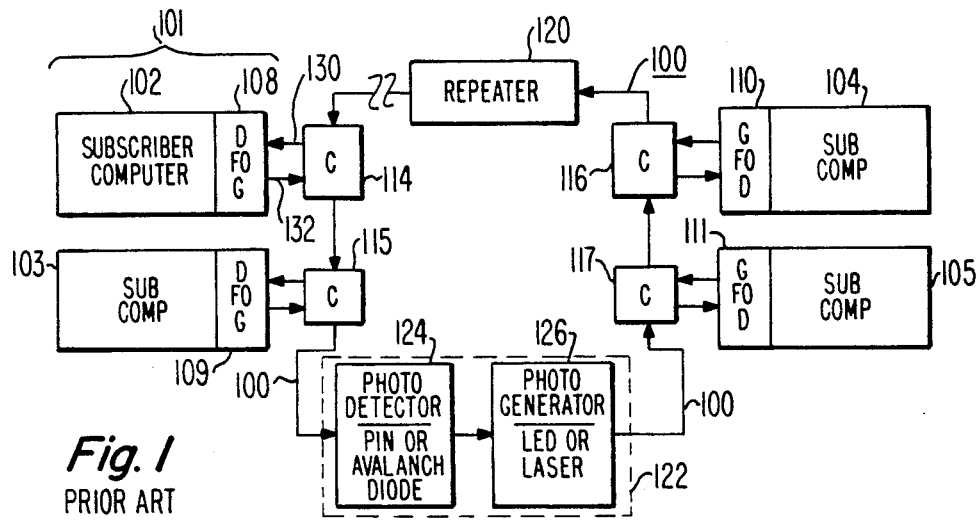

United States Patent [19]

Haworth

[11] Patent Number: 4,527,286
[45] Date of Patent: Jul. 2, 1985

[54] REPEATER FOR FIBER OPTIC BUS DISTRIBUTION SYSTEM

[75] Inventor: Robert F. Haworth, Somerdale, N.J.
[73] Assignee: RCA Corporation, Princeton, N.J.
[21] Appl. No.: 451,429
[22] Filed: Dec. 20, 1982
[51] Int. Cl.³ .............................................. H04B 9/00
[52] U.S. Cl. .................................... 455/601; 455/607; 455/612
[58] Field of Search ................ 455/601, 606, 607, 612; 350/96.16, 96.19

[56] References Cited

U.S. PATENT DOCUMENTS

| | | |
|---|---|---|
| 3,519,935 | 7/1970 | Hochgraf . |
| 3,543,163 | 11/1970 | Rheinfelder .......................... 455/14 |
| 3,992,669 | 11/1976 | Dades . |
| 4,112,293 | 9/1978 | Kach . |
| 4,246,475 | 1/1981 | Altman ................................. 455/612 |
| 4,306,313 | 12/1981 | Baldwin . |
| 4,406,513 | 9/1983 | Raphael ............................... 455/601 |

FOREIGN PATENT DOCUMENTS 55-70144  5/1980  Japan .................................. 455/601

OTHER PUBLICATIONS

Milton-Optical Fiber Applications-Conf. Agard Lecture Series No. 76 on Electro-Optical Systems, London, Eng., May 19-20, 1975, pp. 8-1, 8-21.

Primary Examiner—Joseph A. Orsino, Jr.
Attorney, Agent, or Firm—J. S. Tripoli; R. L. Troike; W. H. Meise

[57] ABSTRACT

In a fiber optic (FO) bus distribution system having a plurality of subscriber stations, a plurality of first star couplers coupled to said FO bus each with first and second input ports and a first output port, a plurality of second star couplers coupled to the FO bus each having a first input port and first and second output ports, at least one signal repeater connected between the first output port of the second star coupler and the first input port of the first star coupler and having a delay time Δ. Also provided is a fiber optic cable connected between the second output port of the second star coupler and the second input port of the first star coupler and having a delay time δ, where δ is substantially equal to Δ.

1 Claim, 2 Drawing Figures

C → COUPLER
D → PHOTO DETECTOR
G → PHOTO GENERATOR
FO → FIBER OPTIC
SUB COMP → SUBSCRIBER COMPUTER
NU → NOT USED

C => COUPLER
D => PHOTO DETECTOR
G => PHOTO GENERATOR
FO => FIBER OPTIC
SUB COMP => SUBSCRIBER COMPUTER
NU => NOT USED

REPEATER FOR FIBER OPTIC BUS DISTRIBUTION SYSTEM

This invention relates generally to a fiber optic (FO) bus distribution system employed to interface a group of distributed microprocessors and more particularly, to such a system that includes fail/safe repeaters (amplifiers) which, within certain limitations, can fail without disrupting the operation of the system.

In bus distribution systems employing a fiber optic bus with distributed processors coupled thereto at various positions the electrical signals of each subscriber processor (station) are converted to light energy by means of the fiber optic transmit portions of a coupler which couples the processor to the FO bus. Conversely, light energy from the FO bus is converted into electrical signals by such coupler means and supplied to the processor.

Each processor or subscriber station is defined as a node of the total system. To couple the light energy in either direction between the FO bus and the stations, four port star couplers are typically employed in the prior art. The four star coupler provides a uni-directional flow of light energy through the FO bus with a portion of the energy passing to the subscriber as electrical energy. Energy is then supplied from the processor back to the coupler where the electrical signals are transformed into light signals and supplied back into the FO bus.

In four port star couplers, however, transfer losses of approximately 3 dB occur. Such losses limit the number of nodes (couplers and stations) which may be interconnected in serial manner along the FO bus, before a given subscriber receiver in the system no longer receives sufficient energy to function properly. Accordingly, repeaters are typically inserted along the FO bus at appropriate intervals to compensate for the losses occurring in the couplers and to maintain the level of transmitted light energy sufficiently high to enable the station detectors to function properly. Such repeaters commonly take the form of a pin or photo avalanche detector placed in the FO bus back-to-back with an LED or laser driver, which together reconstitute the light energy. Such an arrangement, however, has the disadvantage that failure of any one repeater will disrupt the loop and cause a system failure, resulting in loss of data.

The present invention provides a system incorporating a fail/safe repeater which will permit the system to continue operating even after the failure of one or more repeaters.

In accordance with a preferred form of the invention there is provided in an FO bus distribution system comprising an FO bus, a plurality of first star couplers coupled to the FO bus, a plurality of second star couplers each coupled to the fiber optic bus between a different pair of adjacent ones of the first star couplers and a repeater circuit (amplifier) connected between one of the second star couplers and the next first star coupler which is coupled to the FO bus. The repeater circuit comprises circuits for detecting and regenerating the signal supplied thereto from the second star coupler and has a delay time $\Delta$. The repeater circuit further comprises a fiber optic cable connected between the second and first star couplers in parallel with the first circuit means and having a delay time $\delta$, where $\delta = \Delta$. The optical impedances of the first circuit and the fiber optic cable and the spacing of the repeater circuits are such that upon failure of the first repeater circuit the energy passing through the fiber optic cable is sufficient to energize the photo detector at the next repeater circuit. A station subscriber can be connected to selected ones (or all) of the first star couplers which are also connected to the output of a repeater circuit, thereby providing for dual usage of the first star couplers.

Figure 2:
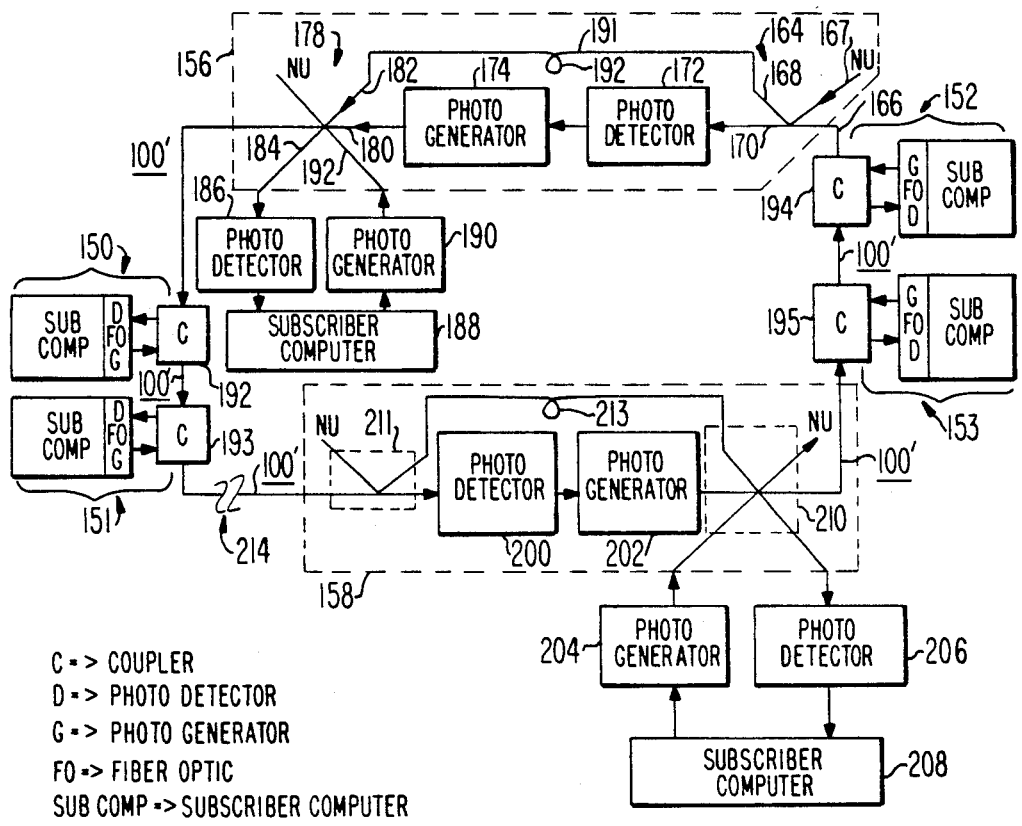

In the drawings:

FIG. 1 is a block diagram of a prior art structure; and
FIG. 2 is a block diagram of the invention.

Referring now to FIG. 1, there is shown a closed loop FO bus 100 through which the information carrying light flows only in the direction of the arrows. Coupled to the bus 100 are four subscriber computers 102, 103, 104 and 105 by means of four star couplers 114, 115, 116 and 117 which transmit and receive optical signals to and from logic elements 108, 109, 110 and 111, respectively. The elements 108–111 each consists of a photo detector designated as D and a photo generator designated as G. The legend FO within the blocks 108–111 indicates that the coupling between the elements 108–111 and the couplers 114–117 are two fiber optic links such as links 130 and 132 which couple coupler 114 to device 108.

Because the couplers 114–117 each produce about a 3 dB loss in the signal passing therethrough it is necessary to have repeaters in the system, such as repeaters 120 and 122. All of these repeaters consist of a photo detector D and a photo generator G such as photo detector 124 and photo generator 126 in repeater 122. The photo detector 124 can be a pin or an avalache diode such as described in chapter 34, pages 57–98 of a publication entitled "Optical Fiber Transmission Systems" by Stewart D. Personick, and published in 1981 by Plenum Press of New York and London.

The photo generator 126 can be an LED or a laser such as described on page 530 of a publication entitled "Fiber Optics", edited by Bernard Bendow and Shashanka S. Mitra, and published by Plenum Press of New York and London in 1979.

As discussed briefly above, failure of a repeater such as either of repeaters 120 or 122 will disable the system.

Referring now to FIG. 2, each of the subscriber stations 150, 151, 152 and 153 corresponds to the subscriber stations of FIG. 1. For example, subscriber station 150 of FIG. 2 corresponds to subscriber station 101 of FIG. 1, which includes computer 102, coupler 114, and logic interface 108. The logic within the two dotted blocks 156 and 158 represents two identical repeaters of the present invention. Two such repeaters are shown to illustrate that repeaters are employed at periodic Nth coupler stages which, in the case of FIG. 2, is every two coupler stages, as for example, couplers 194 and 195 of subscriber stations 152 and 153, respectively. The output signal of coupler 194, which has been attenuated both by coupler 195 and coupler 194 is supplied to four star coupler 164 which has two inputs 166 and 167 and two outputs 168 and 170. Only input 166 is employed in coupler 164. Input 167 is not required in the particular application shown in FIG. 2 and is marked NU (not used). Output 170 of star coupler 164 is supplied to photo detector 172 whose output in turn is supplied to the input of photo generator 174, the output of which is supplied to input 180 of six port star coupler 178.

Photo detector 172 detects the attenuated signal supplied from coupler 164 and photo generator 174 amplifies such attenuated signal to supply a regenerated signal to input port 180 of six port star coupler 178. The passage of the light signal through photo detector 172 and photo generator 174 requires a time interval $\Delta$.

A second circuit path, consisting of a length of fiber optic cable 191, connects output port 168 of star coupler 164 to input port 182 of star coupler 178 and is in parallel with the series arrangement of photo generator 174 and photo detector 172. The length of fiber optic cable 191 has one or more loops therein (actually just a length of FO cable), such as loop 192, so that the total delay of a light signal passing through cable 190 is $\delta$ and is substantially equal to the delay $\Delta$.

The value of $\Delta$ is determined by selecting the proper parameters for photo detector 172 and photo generator 174. It is necessary that $\delta$ is as close to $\Delta$ as possible to ensure that the two signals supplied to input ports 180 and 182 of six port star coupler 178 are in phase and will add.

The relative amounts of signal supplied to photo detector 172 and to cable link 191 from coupler 164 can be determined at the time of manufacture of the coupler. Thus, for example, the energy can be equally divided between the two paths or alternatively, path 191 can receive a greater or lesser amount than that supplied to photo detector 172. The criteria is that in the event of a failure of either photo generator 174 or photo detector 172 the amount of energy supplied through linking cable 191 to six port coupler 178 will be of a sufficient level to service the subscriber computer 188 and the two stations 150 and 151 before being regenerated in the next repeater 158 appearing in the system. As a general rule if the signal loss at each subscriber station, such as station 150 or 151, is 3 dB then the energy level passing through cable link 191 must be such that in the event of a failure of either photo generator 174 or photo detector 172 the energy level supplied to photo detector 200 in repeater 158 will, after 3 dB losses in each of couplers 178, 192 and 193, still be of a sufficient energy level to be detected by photo detector 200 and then amplified by photo generator 202 back up to its desired level, which is about 12 dB above the energy level supplied to detector 200.

It is to be understood that if neither photo detector 172 nor photo generator 174 fail, then the energy supplied to input port 166 of coupler 164 will be amplified in photo generator 174 and will appear at its full strength level at input port 180 of six port star coupler 178.

As mentioned above a five star coupler, such as five star couplers 178 and 210 can be employed at the output of photo generators 174 and 202 of the repeaters, thus permitting a subscriber station to be coupled to the same, common five star coupler and insuring a minimum strength signal to be supplied to such subscriber station. Thus, for example, subscriber station comprised of computer 188, photo detector 186, and photo generator 190 is connected to five star coupler 178 which is also connected to the output of photo generator 174 of repeater 156.

In one form of this invention all of the subscriber stations can be coupled to a five star coupler which is also connected to the output of a photo generator of a repeater.

The subscriber computers such as computer 188, which can be any one of a large number of computers currently available on the market, receives electrical signals from photo detector 186, processes the data therein and then supplies the resultant processed data back to photo generator 190 which, in turn, converts such data (electrical signals) to light energy and supplies the encoded light to FO bus 100'. Devices other than computers can also be employed to receive information from photo detector 186 and then supply processed information back to the system via photo generator 190.

Photo generator 204, photo detector 206, subscriber computer 208, and six star coupler 210 of FIG. 2 correspond respectively, both in structure and in function to photo generator 190, photo subscriber computer 188, and coupler 178, also of FIG. 2.

It is also possible to couple subscriber 188 directly to the electrical input/outputs of photo detector 172 and photo generator 174. This would eliminate subscriber 188 from the system in event of failure of either photo detector 172 or photo generator 174. However, the system actually shown in FIG. 2 allows subscriber computer 188 to stay operational in the event of failure of either generator 174 or detector 172 (assuming generator 190 and detector 186 are operational). If either generator 190 or detector 186 fail, then only the subscriber 188 is lost. The system (less subscriber 188) would remain operational.

Couplers such as the four star coupler 164 and six star coupler 178 in repeater 156, as well as couplers 192, 193, 194, and 195, are manufactured generally in the following manner. A four star coupler is formed by fusing together two parallel optical fibers in a manner such that light entering from the input port of one of the optical fibers will divide and be supplied in predetermined portions to the output sides of the two optical fibers. To form a six star coupler, three fibers are fused together each one having an input port and each having an output port so that the resultant coupler has three input ports and three output ports. A signal supplied to the input port of any of the three fibers will be divided and supplied in predetermined proportions to the output ports of the three fibers. For a more detailed discussion of star couplers, including manufacturing techniques and operating characteristics, reference is made to page 540 of the aforementioned publication entitled "Fiber Optics."

What is claimed is:

1. An improved high-reliability fiber-optic repeater for regeneration of signals on a fiber-optic bus adapted for feeding a plurality of subscriber stations, said repeater comprising: a four-port star coupler including an input port adapted to be coupled to an upstream portion of said fiber-optic bus for receiving therefrom an input signal, a second unused input port, and first and second output ports to which first and second portions of the power of said input signal are coupled, respectively;

a photodetector-photogenerator regenerator pair including an input port coupled to said first output port of said four-port star coupler for receiving said first portion of said power of said input signal, and also including an output port at which a regenerated signal is generated, said regenerated signal having a first delay relative to said input signal;

a second star coupler including first and second input ports and first and second output ports, said first input port being coupled to said output port of said regenerator pair for receiving said regenerated signal therefrom and for coupling said regenerated signal to said first output port, said second output port of said second star coupler being unused, and said first output port of said second star coupler being adapted for coupling to a downstream portion of said fiber-optic bus;

a fiber-optic cable coupled to said second output port of said four-port star coupler and to said second input port of said second star coupler for coupling said second portion of said input signal to said first output port of said second star coupler, said fiber-optic cable having a second delay equal to said first delay whereby said repeater has no provision for coupling to a subscriber station;

wherein the improvement lies in that said second star coupler is a six-port star coupler including a third input terminal and a third output terminal adapted to be coupled to a subscriber generator and a subscriber detector, respectively, whereby said subscriber detector receives said regenerated signal during those intervals in which said regenerator is operative and otherwise receives non-regenerated signals by way of said fiber-optic cable with less loss than if said second star coupler were a four-port star coupler and said subscriber were coupled by a third four-port star coupler to said downstream portion of said fiber-optic bus.

* * * * *